United States Patent
Baües et al.

[11] 4,008,947
[45] Feb. 22, 1977

[54] ELECTRO-OPTICAL SWITCH AND MODULATOR

[75] Inventors: Peter Baües, Krailling; Hans Mahlein; Achim Reichelt, both of Munich; Gerhard Winzer, Munich, all of Germany

[73] Assignee: Siemens Aktiengesellschaft, Berlin & Munich, Germany

[22] Filed: July 28, 1975

[21] Appl. No.: 599,816

[30] Foreign Application Priority Data

Sept. 9, 1974  Germany ............... 2443038

[52] U.S. Cl. ............... 350/96 C; 350/96 WG
[51] Int. Cl.² ............................... G02B 5/14
[58] Field of Search ............ 350/96 C, 96 WG

[56] References Cited
UNITED STATES PATENTS

| | | | |
|---|---|---|---|
| 3,736,045 | 5/1973 | Heidrich et al. | 350/96 WG |
| 3,813,142 | 5/1974 | Buhrer | 350/96 WG |
| 3,883,220 | 5/1975 | Taylor | 350/96 WG |

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

An electro-optical switch and modulator for use in a region of a waveguide system which consists of either intersecting waveguides or branching waveguides, which are arranged on a dielectric substrate and consists of electro-optical material at the region and have at least one insulating layer engaging the region of the waveguides characterized by at least one electrode structure being located at the region and comprising a plurality of electrode fingers extending at right angles to a line which either is a bi-sector of the angle between the intersecting and branching waveguides when the region is located at the point of branching and intersecting or is a longitudinal axis of the waveguide when the region is spaced from the point of branching and intersecting. Preferably, the dielectric insulating layer also consists of an electro-optical material. When more than two electrode structures are used, the fingers may either have equal spacing or possess differing and separate switchable periodicity.

3 Claims, 6 Drawing Figures

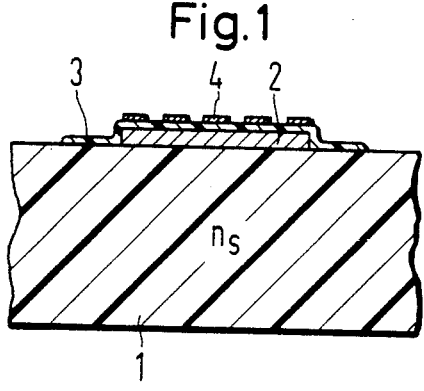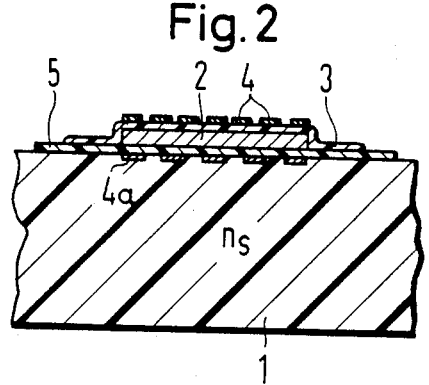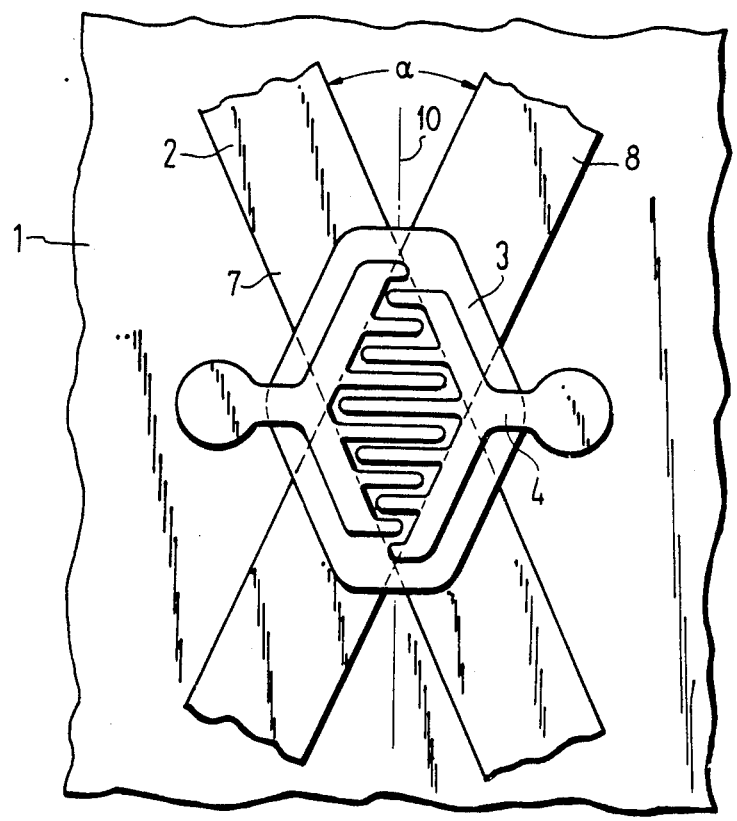

ELECTRO-OPTICAL SWITCH AND MODULATOR

BACKGROUND OF THE INVENTION

1. Field of the Invention

The present invention relates to an electro-optical switch and modulator for intersecting or branching optical waveguides which are arranged on a dielectric substrate with at least one dielectric insulating layer at the region and which waveguides consist of electro-optical material in the region of the switching or modulation point.

2. Prior Art

In optical transmission systems, as in electronic transmission techniques, components, such as modulators and waveguide switches, are used to switch over the electromagnetic radiation between intersecting or branching optical waveguides or to selectively distribute the electromagnetic energy in accordance with the control signal.

SUMMARY OF THE INVENTION

The present invention is directed to providing an electro-optical switch and modulator for either intersecting or branching optical waveguides so that the electromagnetic energy can either be switched over with a particularly high degree of efficiency or be exchanged with a particularly high degree of modulation efficiency while obtaining shorter switching paths. Thus, the switch or modulator of the present invention enables a high degree of integration to be achieved for structures of an integrated optical technique in comparison to known switches and modulator arrangements.

To accomplish these tasks, the invention is directed to an improvement in an electro-optical switch and modulator for use at a region of the waveguide system selected from a group consisting of intersecting waveguides and branching waveguides, with said waveguides being arranged on a dielectric substrate and consisting of an electro-optical material at the region, and the switch and modulator having at least one dielectric insulating layer engaging the region of the waveguide. The improvement comprises at least one electrode structure being located at the region, each of said electrode structures comprising a plurality of electrode fingers extending at right angles to a line, said line being a bisector of an angle $\alpha$ of intersection of the intersecting and branching waveguides when the region is located at the point of branching and intersecting and said line being a longitudinal axis of the waveguide when the region is spaced from the point of branching and intersecting. Preferably, each of the dielectric insulating layers in the region of the electrode structure consists of an electro-optical material. If the switch and modulator includes at least two electrode structures, the electrode fingers of each of the structures either have equal spacing or possess differing and separately switchable periodicity.

BRIEF DESCRIPTION OF THE DRAWINGS

FIG. 1 is a cross-sectional view of an electrode structure in accordance with the present invention;

FIG. 2 is a cross-sectional view of two electrode structures in accordance with the present invention;

FIG. 3 is a plan view of the switch and modulator in accordance with the present invention;

DESCRIPTION OF THE PREFERRED EMBODIMENTS

Figure 4:
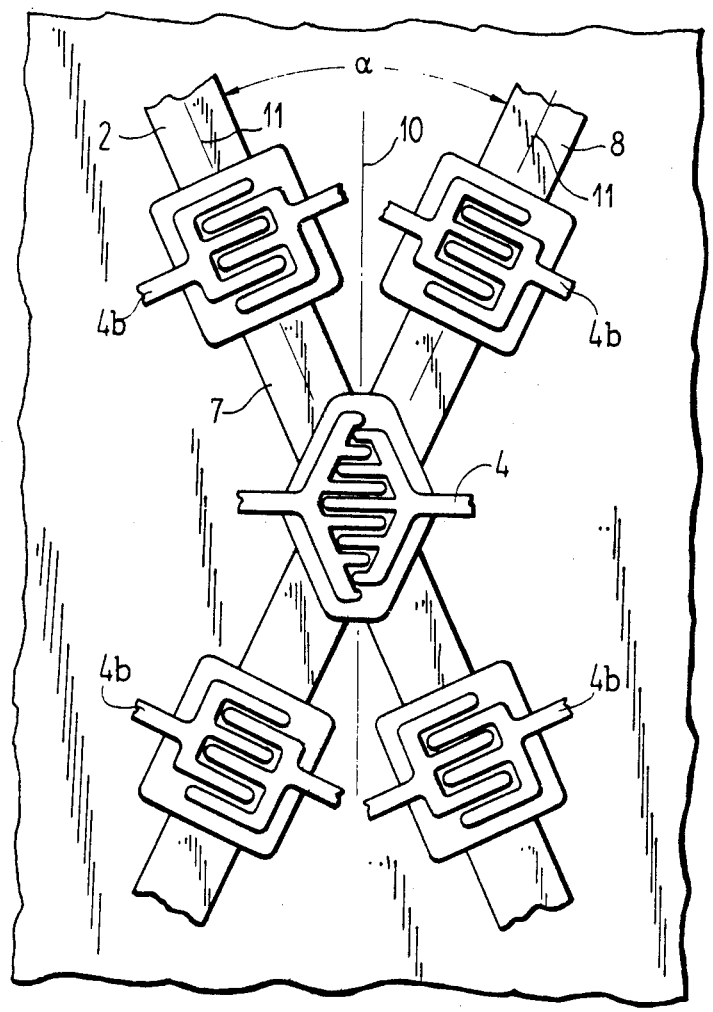
FIG. 4 is a plan view of a plurality of switch and modulators in accordance with the present invention.

The principles of the present invention are particularly useful when incorporated in electro-optical switch or modulator which is illustrated in cross section in FIG. 1. A dielectric substrate 1 has an index of refraction $n_s$. Arranged on a surface of the substrate is either an intersecting or branching waveguide 2. In the region of the modulator, the waveguide consists of an electro-optical material and is provided with overlying dielectric insulating layer 3. The switch and modulator consists of at least one electrode structure 4 which has a plurality of electrode fingers.

In an embodiment illustrated in FIG. 2, the waveguide 2 at the region of the switch and modulator has the overlying dielectric insulating layer 3 and is separated from the surface of the substrate 1 by an underlying dielectric insulating layer 5. In addition, the modulator includes the electrode structure 4 disposed on the insulating layer 3 and a second electrode structure 4a disposed beneath the insulating layer 5.

A plan view of the electro-optical switch and modulator of FIG. 1 is shown in FIG. 3. The waveguides 2 have a pair of intersecting portions 7 and 8 which intersect with an angle of intersection being angle $\alpha$. The fingers of each of the electrode structure 4 are arranged in such a manner that they extend at right angles to a line 10 which bisects the angle $\alpha$. When voltages are connected between the electrode fingers of the structure 4, a variation in the index of refraction occurs in the electro-optical material of the waveguide 2. This variation in the index of refraction allows the electromagnetic radiation, such as light, to be diverted from one waveguide 7 to the other waveguide 8 with a controllable degree of reflection and a controllable degree of transmission. Thus, an optical waveguide switch and modulator can be realized with the arrangement of FIG. 3.

For the guidance of a wave of energy, such as a light in a waveguide, it is known that the index of refraction $n_s$ of the substrate and the index of refraction of the insulating layer, such as layers 3 or 5, are selected to be lower than the index of refraction of the material forming the layer of the waveguide. In an arrangement with the electrode structure provided with fingers disposed only above or only below the waveguide, as illustrated in FIGS. 1 and 3, a longitudinal electro-optical effect is exploited. However, in an arrangement, such as illustrated in FIG. 2 in which the fingers of one electrode structure are arranged above the waveguide 2 and the fingers of the other electrode are arranged below the waveguide 2, the index of refraction in the waveguide can be influenced either by the longitudinal electro-optical effect or by the transversal electro-optical effect when a suitable material has been selected for the waveguide.

In FIG. 4, a modulator is disposed at a point of intersection between intersecting waveguide portions 7 and 8 in a manner similar to FIG. 3. The electrode structure 4 has fingers arranged in such a manner that they extend at right angles to the line 10 which bisects the intersection angle $\alpha$. In addition to the electrode structure 4, four modulators or switches, which have an electrode structure 4b, are disposed on the wave portions 7 and 8 at positions which are on opposite sides at the point of intersection and spaced therefrom. Each of the electrode structures 4b have their electrode fingers arranged to extend at right angles to a line 11 which is illustrated as being a longitudinal axis of the waveguide portions 7 and 8.

In a waveguide system having a plurality of intersecting points and branch points, for example, a waveguide matrix used in an optical switching technique, the entire waveguide matrix can be constructed from electro-optical materials. A waveguide structure of electro-optical materials can be obtained by etching an electro-optical layer. It can also be obtained by ion implantation of the waveguide layer or by a diffusion treatment of the layer and other similar methods.

Figure 5:
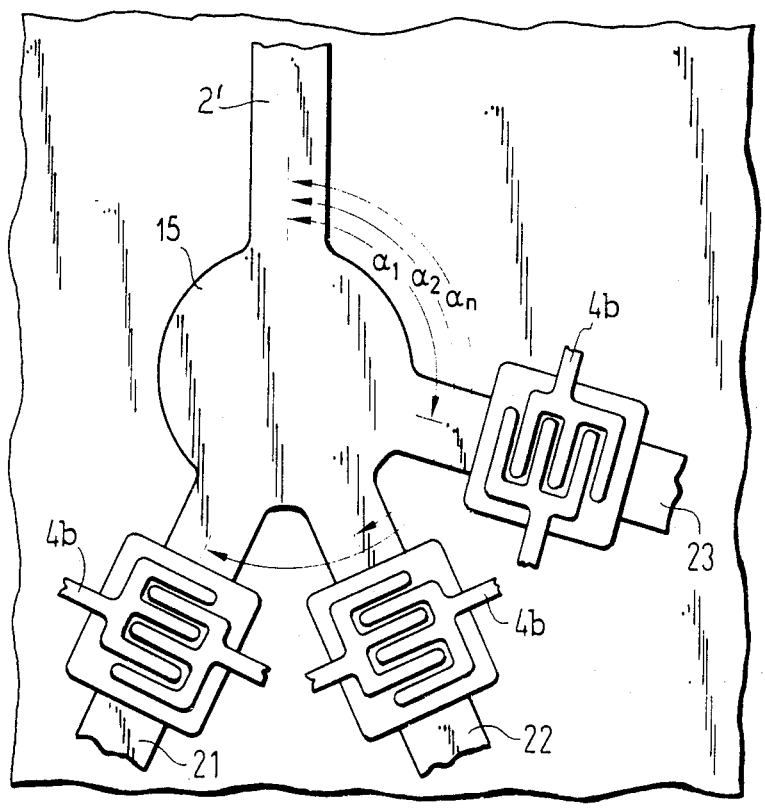
FIG. 5 illustrates a branch point with three switches and modulators.

A matrix having one branch point is illustrated in FIG. 5. In this matrix, an incoming waveguide 2' has a node 15 with three outgoing branch lines, illustrated as outgoing waveguide portions 21, 22 and 23 whose axes extend at angles $\alpha_1$, $\alpha_2$ to $\alpha_n$ from the waveguide 2'. An electro-optical switch and modulator which has electrode arrangement 4b is disposed on each of the waveguides 21, 22 and 23 at a point spaced from the node 15. As in the embodiment of FIG. 4, the fingers of the electrode structure 4b extend perpendicular or at right angles to the axes of each of the respective waveguides 21, 22 and 23.

At all of the inputs and outputs of the intersection point, a blocking switch or modulator, which are based on the same switching and modulation principles could be arranged and these switches and modulators can be operated in association with a central switch or modulator disposed at the intersection point. The distribution of the radiation into various waveguides which are fed at the angles $\alpha_1$ to $\alpha_n$ from a waveguide 2' via the node 15 can also be effected solely by the switches on each of the outgoing waveguides 21, 22 and 23.

Figure 6:
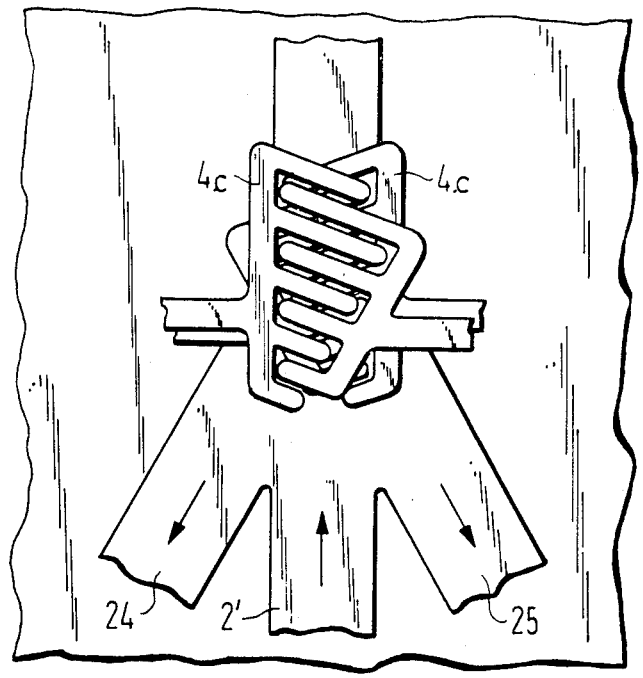
FIG. 6 illustrates a branch point with two switches and modulators.

FIG. 6 shows another arrangement of a switch and modulator for a branch point with one incoming waveguide 2' and two outgoing waveguides 24 and 25. In this case at the branch point, the modulator includes two electrode structures 4c and 4d with one structure 4c being arranged above the branch point and the other structure 4d being arranged below the branch point and in mirror symmetry to the structure 4c. The electrode structure such as 4c and 4d can have electrode fingers which are equally distant or can possess separately switchable periodicity which differs in various subzones. For example, the upper lying bipolar electrode finger structure 4c may possess a different periodicity to the electrode finger structure 4d of the underlying structure. This provides the possibility of switching different wave lengths of light. By providing different directions of orientation for the electrode fingers of the electrode structure 4c and 4d, the radiation can be diverted in different waveguides in an independent manner. It is noted that the electrode fingers of structure 4c extend at right angles to a line bisecting the angle of intersection between waveguide 2' and 24 and that the electrode fingers of the structure 4d extend at right angles to a line bisecting the angle of intersection of the waveguide 2' and the branch line or waveguide 25.

In another embodiment of the invention, the dielectric insulating layer 3 can also consist of electro-optical material. Thus, each of the above described embodiments can be further modified by the provision of a dielectric insulating layer consist of an electro-optical material. The electro-optical material of the insulating layer can be obtained by special crystal cutting and/or crystal selection or by using an isotropic electro-optical material. These electro-optical materials cause an effect which reinforces the periodicity arising in the waveguides.

Known switch and modulator arrangements exploit the effect of the diffraction of light on grating structures and only imposed a slight intervention into the guidance property of the waveguides. In comparision, the switch and modulators, in accordance with the present invention, enable influencing the guidance property of the waveguides to a greater extent. In addition, the structure of the switch and modulator of the present invention enables a reduction of the requirements for accuracy of construction without a loss in the switching and modulating characteristics.

Although various minor modifications might be suggested by those versed in the art, it should be understood that we wish to employ within the scope of the patent granted hereon, all such modifications as reasonably and properly come within the scope of our contribution to the art.

We claim:

1. In an electro-optical switch and modulator for use in a region of a waveguide system selected from a group consisting of intersecting waveguides and branching waveguides, said waveguides being arranged on a dielectric substrate and consisting of an electro-optical material at the region with at least one dieletric insulating layer engaging the region of the waveguide, the improvements comprising at least one electrode structure being located at the region, each electrode structure comprising a plurality of electrode fingers extending at right angles to a line, said line being a bisector of an angle $\alpha$ of intersection of the intersecting and branching waveguides when the region is located at the point of branching and intersecting and said line being a longitudinal axis of the waveguide when the region is spaced from the point of branching and intersecting, and each of the dielectric insulating layers in the region of the electrode structure consisting of an electro-optical material.

2. In an electro-optical switch and modulator according to claim 1, wherein at least two electrode structures are utilized, and the electrode fingers of each of the structures have an equal spacing.

3. In an electro-optical switch and modulator according to claim 1, wherein at least two electrode structures are utilized and wherein the electrode fingers of the electrode structures possess differing and separately switchable periodicity.

* * * * *